May 31, 1966  A. S. VOLPIN  3,253,609
PUSH-PULL AUTOMATIC SEALING SYSTEM FOR VALVES
Filed July 1, 1963  2 Sheets-Sheet 1

Alexander S. Volpin
INVENTOR.

BY

ATTORNEY

May 31, 1966          A. S. VOLPIN          3,253,609
PUSH-PULL AUTOMATIC SEALING SYSTEM FOR VALVES
Filed July 1, 1963          2 Sheets-Sheet 2
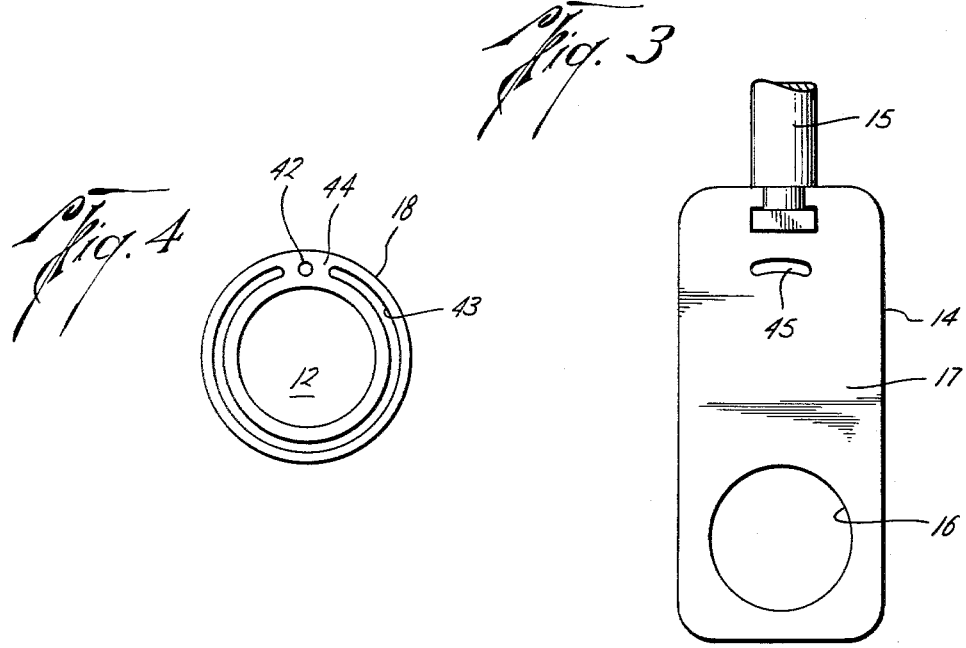
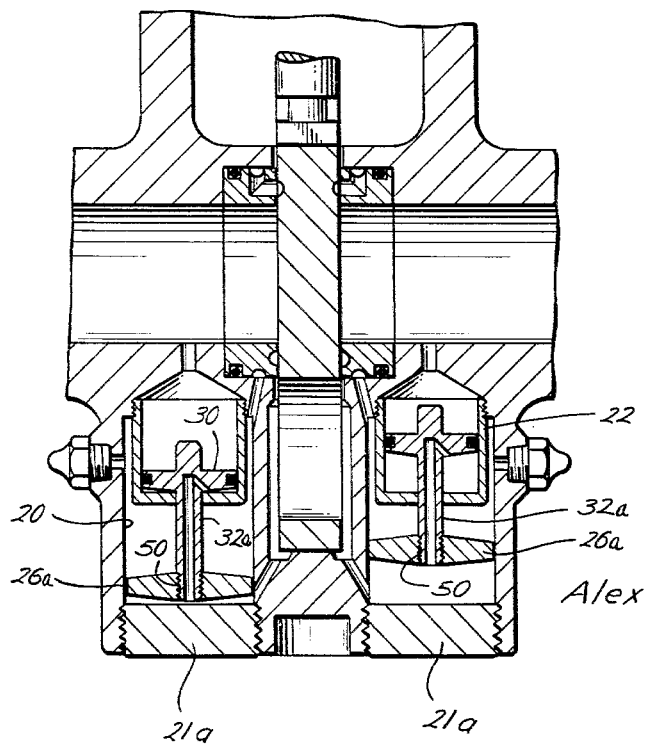
Alexander S. Volpin
INVENTOR.
BY
ATTORNEY United States Patent Office 3,253,609
Patented May 31, 1966

3,253,609
PUSH-PULL AUTOMATIC SEALING SYSTEM
FOR VALVES
Alexander S. Volpin, 10200 W. Broadview Drive,
Miami Beach, Fla.
Filed July 1, 1963, Ser. No. 291,833
8 Claims. (Cl. 137—246.12)

This invention relates to automatic plastic-sealed valves.

In automatic plastic-sealed valves flowable or plastic sealant material is forced automatically from storage reservoirs into sealing groove systems disposed about the flowway between the closure member and valve seat. In most such valves, the sealing is effected on the downstream side of the valve. The actuating force upon the sealant is differential line fluid pressure developed across the closure member when it is moved to the flowway-closing position.

It is desirable in all instances that as the closure member attains the flowway-closing position, the sealant should fill the groove system very quickly in order to effect a complete and effective seal. This is particularly important in the case of valves for large diameter pipes. In such cases the sealing groove system is of considerable length and cross-sectional dimension and requires a substantial volume of sealant to completely fill it.

The present invention has for its primary object the provision of a sealant supply system which will effectively meet the requirements for quick and efficient automatic sealing in valves of the type just described.

In the more conventional automatic sealed valves of the type described, a single slidable barrier or piston is employed in a sealant reservoir to force the sealant into the sealing groove system in response to the line pressure across the valve when in closed position. Due to an, at times, insufficient pressure drop in the groove system and viscosity of the sealant, such single piston arrangements do not always respond sufficiently rapidly to fill the sealant grooves with sufficient speed to avoid some leakage across the sealing surface with consequent erosion and abrasion under the high differential pressures and velocity which are frequently developed.

It is a principal object of this invention to provide an arrangement in which a supplemental piston is coupled to the principal sealant barrier or piston and is exposed to the line pressure under conditions which will greatly supplement the sealant-displacing force of the main sealant barrier and greatly increase the rapidity of transfer of sealant from the reservoir to the groove system. I term the arrangement a "push-pull" system in that the sealant-displacing barrier is pushed by the line pressure while the supplemental piston functions effectively to pull the principal sealant barrier in the sealant-displacing direction with substantial additional force in response to the same line pressure.

In accordance with one embodiment of this invention, the usual reservoir containing the sealant and communicating at spaced points with the sealing groove system and with the closure chamber, is provided with a separate chamber which functions as a booster cylinder. A piston is slidably disposed in the booster cylinder and is coupled by means of a piston rod to the principal sealant barrier. Passage means, which may be arranged to extend through the piston rod, is provided for communicating the line pressure to the booster piston in an arrangement which enables the latter to add the force developed by the line pressure differential across the booster piston to that exerted by the line pressure on the principal sealant barrier.

A further object is the provision of a sealing system wherein the sealant reservoir is provided with a pair of pistons reciprocable in separate chambers or cylinders, one of which contains the sealant and the other of which serves as a booster cylinder to increase the sealant-displacing force on the principal sealant piston.

A more specific object is the provision of a reservoir system for automatic sealing in a valve of the general character described which includes a cylindrical sealant reservoir communicating at spaced points, respectively, with the closure chamber and with the sealing groove system and having a principal sealant-displacing barrier or piston slidable therein, in combination with a second cylinder concentric with but separate from the sealant reservoir, which has one end in communication with the flow passage through the valve. The second cylinder is equipped with a supplemental or second piston which is coupled to the principal sealant-displacing piston by means of a hollow rod which extends slidably into the booster cylinder and has a passageway therethrough providing communication for the line pressure in the closure chamber to the interior of the booster cylinder beneath the supplemental piston. This arrangement thereby increases very greatly the total pressure-effective area of the pistons which is operable to displace sealant from the reservoir into the sealing groove system.

An additional object is to provide resilient biasing means for urging the principal sealant-displacing piston against the body of sealant, the piston having a slidable connection between the latter and the coupling rod connecting it to the supplemental piston, whereby to preclude leakage of line fluid into the reservoir after sealant has been delivered to the sealing grooves.

Other and more specific objects and advantages of this invention will become more readily apparent from the following detailed description when read in conjunction with the accompanying drawing which illustrates several useful embodiments in accordance with this invention.

FIG. 3 is an elevational view of one side of the closure member;

FIG. 4 is an elevational view of one of the gate seats showing the groove arrangement therein; and FIG. 5 is a longitudinal cross-sectional view similar to FIG. 1, illustrating another embodiment in accordance with this invention.

Figure 1:
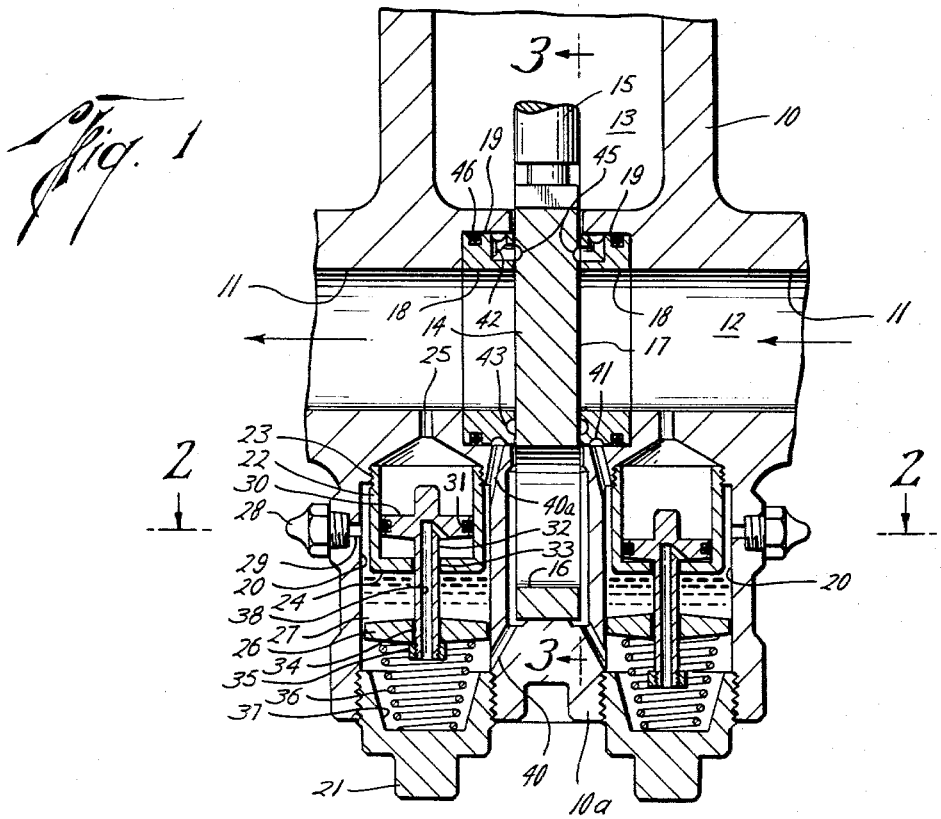
FIG. 1 is a longitudinal cross-sectional view of a valve in accordance with one embodiment of this invention, the closure member being shown in the flowway closing position.
Figure 2:
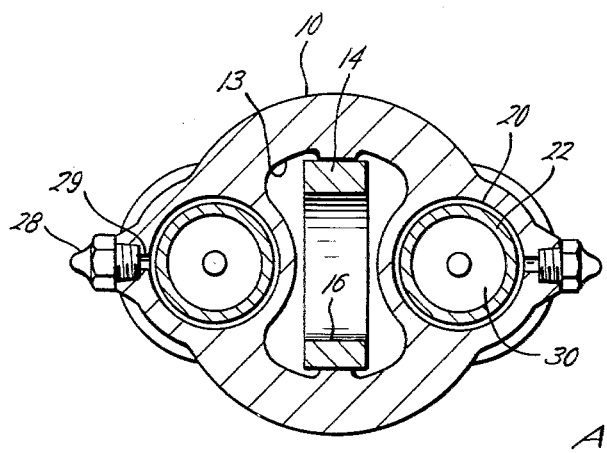
FIG. 2 is a transverse sectional view taken generally along line 2—2 of FIG. 1.

Referring to FIGS. 1 to 4 of the drawing, the valve in the embodiment illustrated comprises a housing 10 having co-axially opposed flow ports 11—11 defining a flowway 12, which is intersected interiorly of the housing by the closure chamber 13. A closure member 14 is connected to the lower end of a stem 15 for longitudinal sliding movement in the gate chamber across the flowway. It will be understood that stem 15 will extend through a bonnet (not shown) conventionally employed for closing the upper end of the gate chamber and that the stem will be equipped with operating means (not shown) for reciprocating the same in the conventional manner. Closure member 14 may be a generally rectangular flat-sided gate of the well-known through conduit type having an opening 16 through the lower end thereof and a solid portion 17 above opening 16 which is adapted to be disposed across flowway 12, when the closure member is in its lowermost position, to close the flowway, as seen in FIG. 1. When the closure member is raised to its upper position it will be understood that opening 16 will be aligned with flowway 12 to open the same. Flow ports 11—11 are provided at their inner ends with annular gate seats 18—18 which, is the illustrative embodiment, may be removably mounted in counterbores 19—19 in the inner ends of the flow ports. It will be understood that instead of employing removable seats, the inner ends of flow ports 11—11 may be, if desired, machined or otherwise finished to define the seats adapted for slidable engagement by the closure member.

Housing 10 has formed therein a pair of sealant reservoirs 20—20 vertically disposed on opposite sides of closure chamber 13. Reservoirs 20—20 form parts of automatic sealing systems for effecting automatic plastic sealing between seats 18 and the adjacent sides of the closure member. These sealing system are identical and are generally symmetrically arranged with respect to the closure member, the dual systems being provided so that either end of the valve may function as the upstream or downstream end, depending upon the orientation of the valve in the pipe line into which it is connected.

For purposes of this description, since both sealing systems are identical, the sealing system for one side of the valve will be described in detail, it being understood that the description will thus apply to both sealing systems.

Reservoir 20 opens through the bottom wall 10a of housing 10 and its outer end is closed by means of a screw plug 21. A cylinder 22 is coaxially positioned in the inner end of reservoir 20, being externally threaded at 23 to be screwed tightly into a counterbore provided at the inner end of reservoir 20. At its inner end cylinder 22 is closed by means of a head 24 and the opposite end of the cylinder is in communication with flowway 12 through a port 25. Cylinder 22 is thus effectively separated from reservoir 20. A principal sealant-displacing piston or barrier 26 is slidably mounted in reservoir 20 between cylinder head 24 and plug 21 and is arranged to confine a body of plastic sealant 27 of any suitable type which is introduced into reservoir 20 above barrier 26 through a conventional pressure fitting 28 positioned in the wall of housing 10 to communicate with reservoir 20 through a port 29.

A second or booster piston 30 is slidably disposed in cylinder 22 and is provided with seal packing 31 in its outer periphery. Booster piston 30 is mounted on piston rod 32 which extends slidably through an opening 33 in cylinder head 24 and also extends slidably through an axial opening 34 in barrier 26. The lower end of piston rod 32 carries a nut 35 which bears against the lower side of barrier 26. With this arrangement it will be seen that a coupling arrangement is provided between the pistons which enables upwardly directed force on the booster piston to be applied to barrier 26, while permitting the latter to move upwardly independently of the booster system under conditions and for purposes to be described more fully hereinafter. A coil spring 36 is seated in a well 37 provided in plug 21 and bears against the lower face of barrier 26 biasing the latter upwardly. A passageway 38 is provided in piston rod 32 opening at its lower end beneath barrier 26 and at its opposite end into the interior of cylinder 22 beneath booster piston 30. Thus open pressure communication is provided between the portion of reservoir 20 beneath barrier 26 and the portion of cylinder 22 beneath booster piston 30.

A passageway 40 communicates closure chamber 13 with the portion of reservoir 20 beneath barrier 26. The upper portion of reservoir 20 above barrier 26 communicates via a passage 40a with an annular channel 41 formed in the periphery of seat 18. The latter, in turn, communicates through a lateral passage 42 with a sealing groove system of the valve. As best seen in FIGS. 3 and 4, the sealing groove system comprises a groove 43 provided in the outer face of seat 18 about flowway 12. Sealing groove 43 is interrupted at one point by a short section 44 into which lateral passage 42 opens. Thus, there is no direct communication between groove 43 and lateral passage 42 in the seat face. However, closure member 14 is provided with a short arcuate jumper groove 45 which is adapted to span section 44 and put the interrupted ends of groove 43 into communication, thereby defining with groove 43 a complete groove circuit ("full-port" groove) about the flowway. The end of lateral passage 42 will communicate with jumper groove 45 when the latter is in registration with the ends of groove 43 to place the groove system into communication with the sealant supply. Jumper groove 45 is so positioned in the face of closure member 14 that it will be in registration with the sealing groove only when the closure member is in the flowway-closing position, seen in FIG. 1. As soon as the closure member begins to move upwardly toward the open position, communication between jumper groove 45 and groove 43 will be broken, thereby cutting off the flow of sealant to the sealing groove. As soon as sufficient movement has occurred to open the flowway, of course, the pressure across the valve will be equalized and no more sealant will flow from passage 42. An annular seal ring 46, such as a conventional O-ring, may be disposed about the periphery of seat 18 between channel 41 and the bottom of counterbore 19 to prevent leakage of fluid past the seat.

Operation of the valve will now be described in connection with the embodiments of FIGS. 1 to 4, wherein the direction of flow is indicated by the arrows in FIG. 1, and the closure member is in the closed position, it being assumed that it has just moved to the flowway closing position, thereby creating line pressure differential across the valve. The line pressure acting on the upstream side of the closure member will urge the latter slightly away from the upstream seat face, permitting the pressure to work its way between the upstream side of the closure member and the related seat into chamber 13 whence the fluid pressure will flow through downstream passageway 40 and will act against the lower face of the downstream barrier 26, forcing the latter to move upwardly, displacing sealant 27 through downstream passageway 40a into channel 41, and thence via lateral passage 42 and jumper groove 45 into the main downstream sealing groove 43, thus sealing the downstream side of the gate and the related seat. At the same time, the line pressure entering the lower portion of downstream reservoir 20 beneath barrier 26 will flow through passage 38 in the piston rod into the portion of cylinder 22 below piston 30. Since the opposite end of the cylinder is open through port 25 to the downstream flow port, the same line pressure differential acting on barrier 26 will act against the lower face of booster piston 30 developing additional force corresponding to the product of the piston area times the differential pressure, this additional force will be additive to that being applied to the lower face of barrier 26, the effect being to cause booster piston 30 to pull barrier 26 upwardly in the sealant displacing direction. The combination of forces thus applied against the lower faces of barrier 26 and piston 30 will result in a substantial increase in the rapidity with which the sealant is forced out of the reservoir and into the sealing groove system, thereby accomplishing one of the essential objects of the present invention, which is to assure the rapid filling of the sealing groove system when the closure member moves to the flowway closing position. Coil spring 36 is not depended upon to augment the sealant-displacing force on barrier 26, but is of a strength sufficient only to maintain barrier 26 in constant compression against the body of sealant in the reservoir as the sealant is displaced from the reservoir. This will serve to prevent incursion or back-flow of line fluid into the reservoir. By thus preventing the back-flow of line fluid into the reservoir, it will be evident that upon a subsequent closing of the valve there will be little danger that the material being displaced into the sealing groove system will be line fluid rather than the sealant which is desired. By providing the slidable connection between the piston rod and barrier 26, the latter can move independently of the rod and booster piston in response to the biasing force of spring 36.

FIG. 5 illustrates a modification of the previously described structure, the parts of the valve and sealing systems being identical in all respects with the previously described embodiment, except for the specific form of the connection between piston rod 32a and barrier 26a. In the modification of FIG. 5, coil spring 36 is eliminated and the lower end of piston rod 32a is threadedly secured at 50 directly to barrier 26a. The form of closure plugs 21a for the lower ends of reservoirs 20 is also modified slightly as compared with closure plugs 21. In all respects operation of this modification is identical with that previously described, except that no independent movement of barrier 26a with respect to booster piston 30 can occur. Therefore, while this modification lacks some of the advantages of the previously described modification in that there is no automatic means for maintaining barrier 26a in constant compression against the body of sealant, nevertheless, there are many instances in which the maintenance of such compression is unnecessary and hence the modified arrangement will prove entirely satisfactory.

It will be understood that various other modifications and alterations may be made in the details of the illustrative embodiment within the scope of the appended claims, but without departing from the spirit of this invention.

What I claim and desire to secure by Letters Patent is:

1. In an automatic plastic-sealed valve including a housing having a flowway therethrough, a closure member for the flowway movable between positions opening and closing the flowway, a seat in the flowway engageable by the closure member, a sealing groove system disposed about the flowway between the seat and the closure member, a sealant reservoir in the housing having passage communication at spaced points respectively with the interior of said housing and with said sealing groove system, a barrier member slidable in said reservoir between said spaced points operable in response to line pressure across said valve when the closure member is in the flowway-closing position to displace sealant from said reservoir into said sealing groove system, a pressure booster chamber in said housing, a piston slidable in said booster chamber, means operatively coupling said piston to said barrier member for movement therewith in the sealant displacing direction, and passage means communicating the line pressure to said booster chamber arranged to apply said line pressure to said piston in a direction to supplement the sealant-displacing force of said barrier member.

2. In an automatic plastic-sealed valve including a housing having a flowway therethrough, a closure member for flowway movable between positions opening and closing the flowway, a seat in the flowway engageable by the closure member, a sealing groove system disposed about the flowway between the seat and closure member, a sealant reservoir in the housing having passage communication at spaced points respectively with the interior of said housing and with said sealing groove system, a barrier member slidable in said reservoir between said spaced points operable in response to line pressure across said valve when the closure member is in the flowway-closing position to displace sealant from said reservoir into said sealing groove system, a pressure booster chamber in said housing, a piston slidable in said booster chamber, a piston extension operatively coupling said piston to said barrier member for movement therewith in the sealant displacing direction, and passage means communicating the line pressure from said reservoir to said booster chamber and arranged to apply said line pressure to said piston in a direction to supplement the sealant-displacing force of said barrier member.

3. In an automatic plastic-sealed valve including a housing having a flowway therethrough, a closure member for the flowway movable between positions opening and closing the flowway, a seat in the flowway engageable by the closure member, a sealing groove system disposed about the flowway between the seat and the closure member, a sealant reservoir in the housing having passage communication at spaced points respectively with the interior of said housing and with said sealing groove system, a barrier member slidable in said reservoir between said spaced points operable in response to line pressure across said valve when the closure member is in the flowway-closing position to displace sealant from said reservoir into said sealing groove system, a pressure booster chamber in said housing a piston slidable in said booster chamber, a piston rod operatively coupling said piston to said barrier member for movement therewith in the sealant-displacing direction, a slidable connection between the barrier member and said piston rod, means biasing said barrier member toward the piston, and passage means communicating the line pressure from said reservoir to said booster chamber and arranged to apply said line pressure to said piston in a direction to supplement the sealant-displacing force of said barrier member.

4. In an automatic plastic-sealed valve including a housing having a flowway therethrough, a closure member for the flowway movable between positions opening and closing the flowway, a seat in the flowway engageable by the closure member, a sealing groove system disposed about the flowway between the seat and the closure member, a chamber in the housing, partition means dividing said chamber into a sealant reservoir and a separate coaxial pressure booster chamber, said sealant reservoir having passage communication at spaced points respectively with the interior of said housing and with said sealing groove system, a barrier member slidable in said reservoir between said spaced points operable in response to line pressure across said valve when the closure member is in the flowway-closing position to displace sealant from said reservoir into said sealing groove system, a piston slidable in said pressure booster chamber, a piston rod extending through said partition means and operatively coupling said piston to said barrier member for movement therewith in the sealant-displacing direction, and passage means extending through said piston rod for communicating the line pressure from said reservoir to said chamber and arranged to apply said line pressure to said piston in a direction to supplement the sealant-displacing force of said barrier member.

5. In a valve according to claim 4, a slidable connection between the barrier member and said piston rod, and means biasing the barrier member toward the piston.

6. In an automatic plastic-sealed valve including a housing having a flowway therethrough, a closure member for the flowway movable between positions opening and closing the flowway, spaced seats in the flowway engageable by opposite faces of the closure member, a full-port sealing groove system disposed about the flowway between each seat and the opposed face of the closure member, and a sealant supply system for each of said sealing groove systems, each sealant supply system including a sealant reservoir in the housing having passage communication at spaced points respectively with the interior of said housing and with its related sealing groove system, a barrier member slidable in said reservoir between said spaced points therein operable in response to line pressure across said valve when the closure member is in the flowway-closing position to displace sealant from the downstream reservoir into the downstream sealing groove system, a pressure booster chamber in said housing associated with said reservoir, a piston slidable in said booster chamber, means operatively coupling the piston to the barrier member for movement therewith in the sealant-displacing direction, and passage means communicating the line pressure to said booster chamber arranged to apply said line pressure to the piston therein in a direction to supplement the sealant-displacing force of the related barrier member.

7. In an automatic plastic-sealed valve including a housing having a flowway therethrough, a closure member for the flowway movable between positions opening and closing the flowway, spaced seats in the flowway engageable by opposite faces of the closure member, a full-port sealing groove system disposed about the flowway between each seat and the opposed face of the closure member, and a sealant supply system for each of said sealing groove systems, each sealment suply system including a sealant reservoir in the housing having passage communication at spaced points respectively with the interior of said housing and with its related sealing groove system, a barrier member slidable in said reservoir between said spaced points therein operable in response to line pressure across said valve when the closure member is in the flowway-closing position to displace sealant from the downstream reservoir into the downstream sealing groove system, a pressure booster chamber in said housing associated with said reservoir, a piston slidable in said booster chamber, a piston rod operatively coupling said piston to the barrier member for movement therewith in the sealant-displacing direction, and passage means extending through said piston rod for communicating the line pressure from said reservoir to said booster chamber and arranged to apply said line pressure to the piston therein in a direction to supplement the sealant-displacing force of the related barrier member.

8. In an automatic plastic-sealed valve including a housing having a flowway therethrough, a closure member for the flowway movable between positions opening and closing the flowway, spaced seats in the flowway engageable by opposite faces of the closure member, a full-port sealing groove system disposed about the flowway between each seat and the opposed face of the closure member, and a sealant supply system for each of said sealing groove systems, each sealant supply system including a sealant reservoir in the housing having passage communication at spaced points respectively with the interior of said housing and with its related sealing groove system, a barrier member slidable in said reservoir between said spaced points therein operable in response to line pressure across said valve when the closure member is in the flowway-closing position to displace sealant from the downstream reservoir into the downstream sealing groove system, a pressure booster chamber in said housing associated with said reservoir, a piston slidable in said booster chamber, a piston rod operatively coupling the piston to the barrier member in the related reservoir for movement therewith in the sealant-displacing direction, a slidable connection between the barrier member and said piston rod, means biasing said barrier member toward the piston, and passage means communicating the line pressure to said booster chamber and arranged to apply said line pressure to the piston therein in a direction to supplement the sealant-displacing force of the related barrier member.

References Cited by the Examiner
UNITED STATES PATENTS

| | | | |
|---|---|---|---|
| 2,868,221 | 1/1959 | Eichenberg et al. | 137—246.12 |
| 3,190,302 | 6/1965 | Volpin | 137—246.12 |
| 3,190,304 | 6/1965 | Volpin | 137—246.12 |

MARTIN P. SCHWADRON, *Acting Primary Examiner.*

HENRY T. KLINKSIEK, *Examiner.*